(12) United States Patent
Shah et al.

(10) Patent No.: US 7,974,064 B2
(45) Date of Patent: Jul. 5, 2011

(54) PROTECTIVE RELAY AND HUMAN-MACHINE INTERFACE THEREFOR

(75) Inventors: Vijay Shah, Baroda Gujarat (IN); Bernhard Deck, Weilheim (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/793,255

(22) Filed: Jun. 3, 2010

(65) Prior Publication Data

US 2010/0296221 A1 Nov. 25, 2010

Related U.S. Application Data

(63) Continuation of application No. PCT/EP2008/065987, filed on Nov. 21, 2008.

(30) Foreign Application Priority Data

Dec. 5, 2007 (EP) .................................... 07122389

(51) Int. Cl.
*H01H 47/00* (2006.01)
(52) U.S. Cl. ........................ 361/170; 361/115
(58) Field of Classification Search .................. 361/170, 361/115
See application file for complete search history.

(56) References Cited

U.S. PATENT DOCUMENTS

| 4,870,531 | A | | 9/1989 | Danek |
| 5,680,324 | A | * | 10/1997 | Schweitzer et al. .......... 370/241 |
| 6,292,717 | B1 | | 9/2001 | Alexander et al. |
| 6,798,630 | B1 | | 9/2004 | Del Vecchio et al. |
| 7,085,938 | B1 | * | 8/2006 | Pozzuoli et al. .............. 713/300 |
| 7,725,295 | B2 | * | 5/2010 | Stoupis et al. ................ 702/185 |
| 2004/0252421 | A1 | | 12/2004 | Knox, Jr. et al. |

FOREIGN PATENT DOCUMENTS

EP 1 085 633 A1 3/2001

OTHER PUBLICATIONS

International Search Report for PCT/EP2008/065987 completed Feb. 16, 2009.
Written Opinion for PCT/EP2008/065987 completed Feb. 16, 2009.
European Search Report for EP 07122389.5 completed May 23, 2008.

* cited by examiner

*Primary Examiner* — Stephen W Jackson
(74) *Attorney, Agent, or Firm* — Buchanan Ingersoll & Rooney PC

(57) ABSTRACT

A fully operational digital protective relay or Intelligent Electronic Device (IED) are provided for protecting electrical equipment of a power distribution system. The relay includes an input module, a processing module and an output module. Signals received from current transformers connected to the input module are evaluated by the processing module, and in reaction thereto, trip signals can be output to an actuator of a circuit breaker via the output module. A base Human Machine Interface (HMI) enables a user to enter operating parameters such as a delay time or nominal current to the processing module. Optionally, a further HMI may be attached to the protective relay and connected, via a suitable interface for data exchange, to the processing module for the purpose of displaying protection-related information to a user. This further HMI is both optional and detachable. For example, the further HMI can be repeatedly attached to and detached from the protection device. The detachable HMI provides for an increased flexibility in the use of the protective relay, as a user may adapt its interfacing capability by acquiring a detachable HMI of the type and at the time that best suits his evolving needs.

16 Claims, 1 Drawing Sheet

PROTECTIVE RELAY AND HUMAN-MACHINE INTERFACE THEREFOR

RELATED APPLICATIONS

This application claims priority as a continuation application under 35 U.S.C. §120 to PCT/EP2008/065987, which was filed as an International Application on Nov. 21, 2008 designating the U.S., and which claims priority to European Application 07122389.5 filed in Europe on Dec. 5, 2007. The entire contents of these applications are hereby incorporated by reference in their entireties.

FIELD

The present disclosure relates to the field of electrical power distribution. More particularly, the present disclosure relates to a protective relay for protecting electrical equipment in a power distribution system.

BACKGROUND INFORMATION

A power distribution system is the interface between the power transmission network and the electricity end-customers. The power distribution system can include a number of primary substations which are connected to secondary substations via power lines and switches. The primary substations contain transformers that reduce the voltage from the HV (high voltage) level of the transmission or sub-transmission grid down to MV (medium voltage) levels suitable for regional transmission. Distribution level network operation involves secondary devices interacting with primary equipment of the substations and power lines such as switches, tap changers, capacitor banks and the like. A Distribution Automation (DA) system responsible for controlling, protecting, measuring and monitoring includes the secondary devices interconnected in a Substation Automation (SA) communication network and interacting with the primary devices via a process interface.

In automated power transmission and distribution, the secondary devices include microprocessor-based programmable electronic devices or digital relays, also termed Intelligent Electronic Devices (IED), that are capable of sending control signals to switching devices, such as circuit breakers and disconnectors. Most digital relays in use today combine protection, control, monitoring, communication, power quality monitoring, and metering capabilities. The protection functions supported by a digital relay can include time delay and instantaneous over-current functions for phase and ground elements, sequence directional over-current functions, reclosing functions, over- and under-frequency protection functions, and over- and under-voltage protection functions. Digital relay devices also support various metering functions, monitoring of voltage sags, swells and interruptions, fault location algorithms, and oscillographic record storage. In addition, digital relay devices can be configured locally using the front panel of the digital relay or remotely using a settings software tool. In many cases, the required protection functionality is preloaded into the relay device, and later enabled and parameterized with a tool connected to the relay device.

As outlined above, a basic function of a protection relay is to protect electrical equipment by tripping a circuit breaker and interrupting a power line in case of over current or earth fault situations. The tripping signal on behalf of a trip coil or other actuator of the circuit breaker is generated by the protection relay, for example, when the measured current in the line exceeds a nominal or setting value for a predefined time period. For instance, fault currents above twenty times the rated current of a current transformer may cause the protection relay to release a trip signal with 40° msec delay.

For over current and earth fault protection of individual power lines, static auxiliary-powered protection relays with a station battery supplying power for the relay electronics may be used. However, in certain situations such as Ring Main Units (RMU) installations in urban areas, auxiliary-powered protection relays may not be acceptable, and so-called self-powered or self-supplied relays are used instead. In this case, the energy required by the relay electronics circuit as well as the energy released to the trip coil is supplied by current sensing transformers. An optimal balance of the micro-controller hardware design and the associated software is desired, and the self-supplied protection relay may be customized by a user through mechanical binary or Dual In-line Package (DIP) switches for parameter setting, or alternatively through battery-powered alphanumeric LCD based Human Machine Interfaces (HMI).

SUMMARY

An exemplary embodiment of the present disclosure provides a protective relay for protecting electrical equipment in a power distribution system. The exemplary protective relay includes an input module configured to receive a signal indicative of a condition of a medium voltage power line, and a processing module configured to digitally process the signal received by the input module. The exemplary protective relay also includes an output module configured to supply energy to an actuator of a circuit breaker, and a detachable Human Machine Interface (HMI) having input components configured to receive, from a user, input of a setting of an operating parameter of the protective relay. In addition, the exemplary protective relay includes an interface configured to exchange data between the processing module and the detachable HMI, and a base HMI having mechanical switches configured to receive, from a user, input of a coarse setting of the operating parameter of the protective relay. The processing module is configured to receive a fine setting, with a higher resolution than the coarse setting, of the operating parameter from the detachable HMI.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings, and their meanings, are listed in summary form in the list of reference symbols. In principle, identical parts or identically functioning parts are provided with the same reference symbols in the drawings.

DETAILED DESCRIPTION

Figure 1:
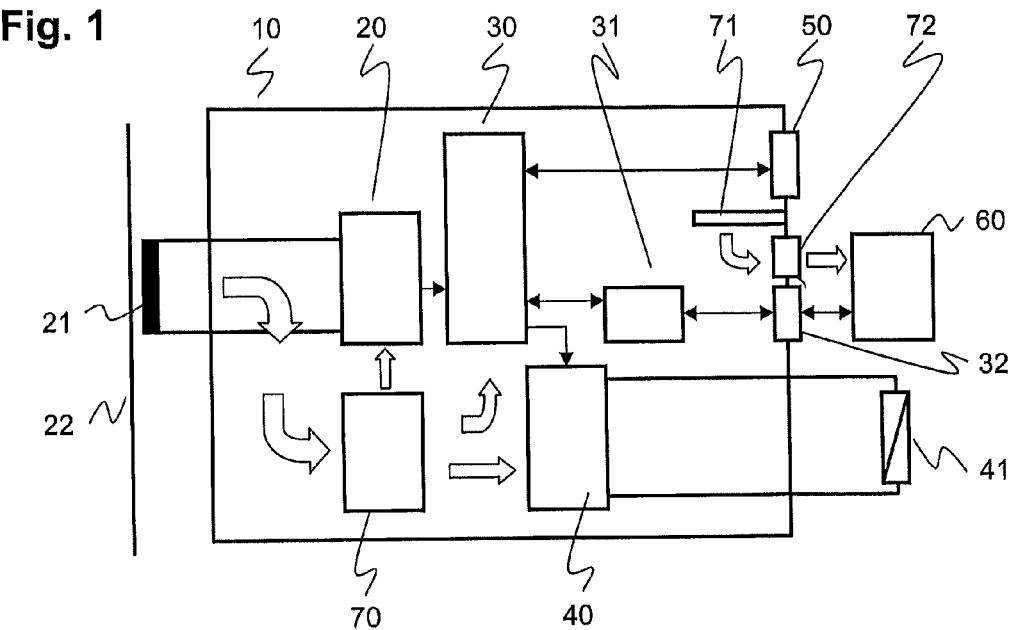
FIG. 1 is a schematic representation of an exemplary protective relay according to an embodiment of the present disclosure.

Exemplary embodiments of the present disclosure provide a protective relay having an increased flexibility of use.

An exemplary embodiment of the present disclosure provides a fully operational digital protective relay or Intelligent Electronic Device (IED) for protecting electrical equipment by tripping a circuit breaker and interrupting a power line. The exemplary protective relay or IED includes an input module, a processing module and an output module. Signals received from current transformers connected to the input module are evaluated by the processing module, and in reaction thereto, trip signals can be output to an actuator of the circuit breaker via the output module. A base Human Machine Interface (HMI) enables a user to enter operating parameters such as delay time or nominal current to the processing module. Optionally, a further HMI may be attached to the protective relay and connected, via a suitable interface for data exchange, to the processing module. This further HMI is both optional and detachable. For example, the further HMI can be repeatedly attached to and detached from the protection device, for example by means of a screw or any other type of removable engagement. The detachable HMI provides for an increased flexibility in the use of the protective relay, as a user may adapt its interfacing capability by acquiring a detachable HMI of the type and at the time that best suits his evolving needs. Furthermore, the two HMIs are configured to be operated in a complementary way, with the base HMI providing for a coarse setting or tuning of an operating parameter, for example, by way of DIP settings, and the detachable HMI providing, via its advanced input means, for a fine tuning of the same operating parameter. A user may thus specify, or choose, a coarse setting via the base HMI, and optionally provide a more detailed input via the detachable HMI.

In accordance with an exemplary embodiment of the present disclosure, the protective relay is self-powered and is supplied with the necessary energy by current sensing transformers, whereas the base HMI includes a number of mechanical binary or Dual In-line Package (DIP) switches for parameter setting. This makes the relay suitable for certain application areas where auxiliary power supply for the protective relays may not be feasible, while at the same time a powerless non-fading feedback about the operating parameters is provided to the user by the mechanical switches.

In accordance with an exemplary embodiment of the present disclosure, the protective relay is adapted to accommodate, in a recess of its housing, an auxiliary or backup power supply such as a battery or capacitor, for example. The auxiliary or backup power supply accommodated in the protective relay enables the HMI to continue operating, at least for a limited amount of time necessary to properly record pre-fault data, even once the power line has been shut off and, as a consequence, the self-power supply inactivated.

Advantageously, the detachable HMI itself includes, in addition to a display for providing information to the user, means for entering, by the user, any type of input on behalf of the processing module, such as binary yes/no responses, numerical values, and/or operating parameter settings, for example. To this end, the detachable HMI can include a numerical keyboard, cursor-control push buttons, and/or a touch screen, for example.

According to an exemplary embodiment of the disclosure, whenever the user sets a particular parameter via the base HMI, the display of the detachable HMI instantly depicts this setting, and a menu lists further options related to that particular parameter.

FIG. 1 is a schematic representation of an exemplary protective relay 10 including modules or parts thereof together with some contextual elements. An analog input module 20 is connected to a current sensing transformer 21, which in turn provides a current signal that is representative of the current in power line 22. The input module 20 provides for current signal filtering and conditioning, and is connected to a processing module 30. The processing module 30 evaluates or analyzes the current signal, and orders an output module 40 to generate a trip signal on behalf of a trip coil 41 of a circuit breaker. A power supply module 70 is supplied with power by the current sensing transformer 21 and feeds power to the other modules 20, 30, 40, with power supply directions being indicated by block arrows in FIG. 1.

A base Human Machine Interface (HMI) 50 in the form of a number of DIP switches is connected to the processing module 30. Likewise, a detachable HMI 60 is connected, when properly attached to the protective relay 10, via signal plug or connector 32 and communication interface 31, e.g. of the RS 232 type, to the processing module 30. A battery 71 is provided as a backup and supplies power to the detachable HMI 60 through power plug or connector 72.

Figure 2:
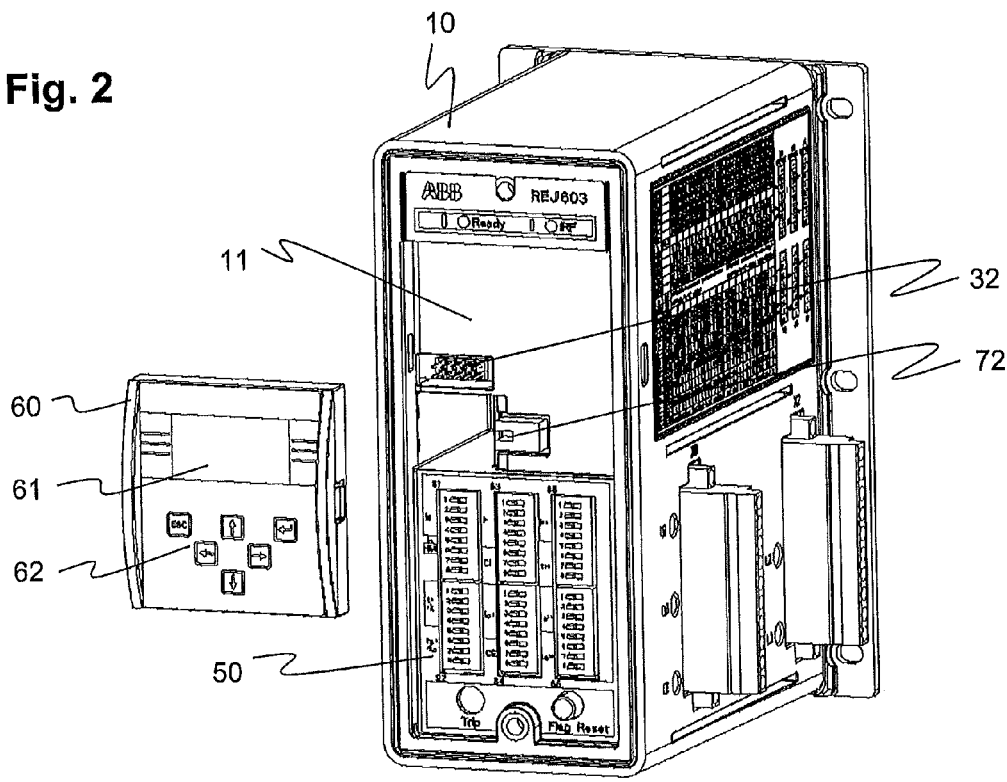
FIG. 2 is a perspective drawing of the exemplary protective relay according to an embodiment of the present disclosure.

FIG. 2 schematically depicts a perspective view of the exemplary protective relay 10. An HMI slot 11 is provided as a recess in the housing of the protective relay. The detachable HMI 60 or a dummy cover may be inserted in a reversible way in the HMI slot 11. In the HMI slot 11, signal plug 32 and power plug 72 are provided and form cable-less contacts with matched mating connectors on the rear side of the detachable HMI 60. The detachable HMI includes an LCD display 61 as well as a number of push buttons 62 for cursor control or, alternatively, a touch screen for a two-way information transfer. By way of the aforementioned input means, and in addition to the mechanical binary DIP switch settings of the base HMI 50 on the front of the protective relay, finer settings with higher resolution for operating parameters become available to a user. The display 61 is graphical and not just alphanumeric, and thus allows tracing, for example, phase and earth currents as a function of time. The detachable HMI 60 can also include adequate memory means for retrieving and storing, thanks to the auxiliary power provided by the battery 71, fault record data from the protective relay.

According to an exemplary embodiment, the processing module 30 and/or the detachable HMI 60 can include at least one processor (e.g., ARM processor, ASIC (application specific integrated circuit) and/or other suitable processing circuitry) which can execute computer-readable instructions and/or a computer program recorded on a computer-readable recording medium (e.g., a non-volatile memory such as a ROM (read only memory), flash drive, optical memory, etc.) to carry out the functions and features of the exemplary embodiments described herein.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 protective relay
11 HMI slot
20 input module
21 Current Transformer
22 power line
30 processing module
31 communication interface
32 signal plug
40 output module
41 trip coil 50 base HMI
60 detachable HMI
61 display
62 push buttons
70 power supply module
71 battery
72 power plug

What is claimed is:

1. A protective relay for protecting electrical equipment in a power distribution system, comprising:
   an input module configured to receive a signal indicative of a condition of a medium voltage power line;
   a processing module configured to digitally process the signal received by the input module;
   an output module configured to supply energy to an actuator of a circuit breaker;
   a detachable Human Machine Interface (HMI) having input components configured to receive, from a user, input of a setting of an operating parameter of the protective relay;
   an interface configured to exchange data between the processing module and the detachable HMI; and
   a base HMI having mechanical switches configured to receive, from a user, input of a coarse setting of the operating parameter of the protective relay,
   wherein the processing module is configured to receive a fine setting, with a higher resolution than the coarse setting, of the operating parameter from the detachable HMI.

2. The protective relay according to claim 1, comprising:
   a power supply module configured to receive power from the medium voltage power line.

3. The protective relay according to claim 2, wherein the power supply module is configured to accommodate an auxiliary power supply for supplying power to the detachable HMI.

4. The protective relay according to claim 1, wherein the detachable HMI comprises input components including at least one of push buttons and a touch screen, and
   the processing module is configured to receive input data, from a user, via the input components of the detachable HMI.

5. A Human Machine Interface (HMI) comprising input means and a display, the HMI being configured to be attached to the interface of the protective relay for protecting electrical equipment in a power distribution system according to claim 1.

6. The HMI according to claim 5, wherein the HMI comprises at least one of push buttons and a touch screen for receiving, from a user, input data to the processing module.

7. The HMI according to claim 5, wherein the HMI is configured to receive the coarse setting of an operating parameter of the protective relay, and the display is configured to display the coarse setting to a user.

8. A Human Machine Interface (HMI) comprising input means and a display, the HMI being configured to be attached to the interface of the protective relay for protecting electrical equipment in a power distribution system according to claim 2.

9. The HMI according to claim 8, wherein the HMI comprises at least one of push buttons and a touch screen for receiving, from a user, input data to the processing module.

10. The HMI according to claim 8, wherein the HMI is configured to receive the coarse setting of an operating parameter of the protective relay, and the display is configured to display the coarse setting to a user.

11. A Human Machine Interface (HMI) comprising input means and a display, the HMI being configured to be attached to the interface of the protective relay for protecting electrical equipment in a power distribution system according to claim 3.

12. The HMI according to claim 11, wherein the HMI comprises at least one of push buttons and a touch screen for receiving, from a user, input data to the processing module.

13. The HMI according to claim 11, wherein the HMI is configured to receive the coarse setting of an operating parameter of the protective relay, and the display is configured to display the coarse setting to a user.

14. A Human Machine Interface (HMI) comprising input means and a display, the HMI being configured to be attached to the interface of the protective relay for protecting electrical equipment in a power distribution system according to claim 4.

15. The HMI according to claim 14, wherein the HMI comprises at least one of push buttons and a touch screen for receiving, from a user, input data to the processing module.

16. The HMI according to claim 14, wherein the HMI is configured to receive the coarse setting of an operating parameter of the protective relay, and the display is configured to display the coarse setting to a user.

* * * * *